United States Patent

Redepenning et al.

[11] Patent Number: 5,948,370
[45] Date of Patent: Sep. 7, 1999

[54] SPRAY TONER FOR THE REMOVAL OF DUST FROM CARBONIZATION GAS

[75] Inventors: Karl-Heinz Redepenning, Raesfeld; Andreas Schleiffer; Bernd Uckermann, both of Dorsten, all of Germany

[73] Assignee: Veba Oel Technologie und Automatisierung GmbH, Germany

[21] Appl. No.: 08/930,382

[22] PCT Filed: Apr. 9, 1996

[86] PCT No.: PCT/EP96/01514

§ 371 Date: Dec. 1, 1997

§ 102(e) Date: Dec. 1, 1997

[87] PCT Pub. No.: WO96/31272

PCT Pub. Date: Oct. 10, 1996

[30] Foreign Application Priority Data

Apr. 6, 1995 [DE] Germany ............................ 195 12 850

[51] Int. Cl.[6] .......................... B01D 50/100; B01D 47/06
[52] U.S. Cl. .......................... 422/169; 422/189; 422/188; 48/128; 261/117
[58] Field of Search .............................. 261/17, 111, 113, 261/115, 117; 95/200; 48/128; 422/169, 188, 189

[56] References Cited

U.S. PATENT DOCUMENTS

| 1,493,579 | 5/1924 | Walter | 95/200 |
|---|---|---|---|
| 2,747,847 | 5/1956 | Otto | 261/147 |
| 2,856,171 | 10/1958 | Otto | 261/111 |
| 2,972,393 | 2/1961 | Bush | 95/197 |
| 4,039,307 | 8/1977 | Bonder | 96/235 |
| 4,211,539 | 7/1980 | Bierbach et al. | |

FOREIGN PATENT DOCUMENTS

| 290 002 | 11/1988 | European Pat. Off. |
| 1809874 | 6/1970 | Germany |
| 2735566 | 2/1979 | Germany |
| 237182 | 7/1986 | Germany |

OTHER PUBLICATIONS

International Search Report dated Aug. 6, 1996.
International Preliminary Exam Report dated Jun. 17, 1997.

*Primary Examiner*—Hien Tran
*Assistant Examiner*—James Kennedy
*Attorney, Agent, or Firm*—Vickers, Daniels & Young

[57] ABSTRACT

A process for the removal of dust from gas that has been produced by low temperature carbonization is provided. The process separates solid particles by means of washing oil in a spray washer that also cools the gases that have been produced by low temperature carbonization. The process includes intensively wetting the gases that have been produced with oils that have been condensed out of the stream of the gas. At least a first and second washing stage is provided in the spray washer. The mass flow comprising the washing oil and condensate is collected in the second washing stage and subdivided. Thereafter, the mass flow is fed to both the first and second washing stage as recirculated and recycled washing oil.

7 Claims, 1 Drawing Sheet

SPRAY TONER FOR THE REMOVAL OF DUST FROM CARBONIZATION GAS

The invention concerns a process and a device for the removal of dust from a gas, that has been produced by low temperature carbonization, in which the solid particles are separated in a washer by means of an addition of recycled of oil that has been produced by low temperature carbonization ("washing oil") and the gases, that have been produced by low temperature carbonization, are cooled.

BACKGROUND OF THE INVENTION

A process is known from EP 0 290 002 A2 for the treatment of a gas, that has been produced by low temperature carbonization, in which the separation of the solids takes place in such a way that the solid particles are intensively wetted by the addition of recycled oil, that contains solids and that has been produced by low temperature carbonization, and they are separated by a washer and, at the same time, cooling of the gases takes place that have been produced by low temperature carbonization.

In the first instance with this process, one obtains an oil, that had been produced by low temperature carbonization, that is free from solids. Extensive removal of dust from the gas, that had been produced by low temperature carbonization, is not possible with this process.

A procedure is known from DD 237 182 A5 for the further processing of a gas that has been produced by low temperature carbonization and that derives from the pyrolysis of waste materials. In this process, the liquid hydrocarbons, that are contained in the gas, are separated completely and, among other tasks, they are used in the form of a so-called "inherent condensate" for the removal of fine dust. The inherent condensate is then fed back into the process for separate usage. The remaining pure gas is capable of being stored and is used for heating, synthetic purposes or for the production of electrical energy.

SUMMARY OF THE INVENTION

The hot gas, that has been produced by low temperature carbonization, is preferably subjected to dust removal in the hot state and is then cooled to approximately 200 to 350° C. with cold "inherent gas" either directly in the form of a quench or indirectly via a heat exchanger.

The gas, that has been produced by low temperature carbonization, that emerges from the pre-cooling stage is subjected to the removal of fine dust in a venturi-type washer together with the feeding in of inherent concentrate. The dedusted (dustfree) gas that emerges from the washer is cooled in a direct cooler in countercurrent by cooled "inherent gas" to a gas temperature of 60 to 120° C., whereby the gas temperature is kept at a value above the dew point of the water being contained in the gas that has been produced by low temperature carbonization. The condensate that result from the gas that has been produced by low temperature carbonization in the venturi washer and in the following direct heat exchanger are fed to a separation container and are separated there into a thick tar and into an oil fraction. The thick tar is returned to the pyrolysis reactor. The oil fraction is used wholly or partially in the form of inherent condensate for the treatment of the gas in the venturi-type washer and in the direct cooler.

The task that forms the basis of the invention is to make available a process, and a device that is suitable in this regard, with which gases, that have been produced by low temperature carbonization, can have dust removed from them to an extent as great as possible.

The invention is based on the fundamental concept of removing dust from gases, that have been produced by low temperature carbonization, by removing the solid particles by spray-washing and condensation in several stages of the process, whereby the condensate that is generated is utilized as the washing oil or, as the case may be, it is reused.

In the process in accordance with the invention, the dustladen gases, that have been produced by low temperature carbonization, are led from a low temperature carbonization oven into the spray washer and are treated there in the counter-flow mode using washing oil as the washing agent. The gases, that have been produced by low temperature carbonization, are cooled (quench) as a result of direct heat exchange. Thus the dust fraction in the gas, that has been produced by low temperature carbonization, is washed out of the gas, that has been produced by low temperature carbonization, in at least two washing stages that are preferably arranged one above the other. As a result of this, oil, that is produced by low temperature carbonization, is also generally condensed out of the gas, that has been produced by low temperature carbonization, at least starting from the second washing stage and washing oil that has been volatilized in a saturating stage, that is preferably used is condensed out of the gas, that has been produced by low temperature carbonization. In the second washing stage, this condensate and the washing oil, that is used in the second washing stage, are taken out subdivided into at least two mass flows; of these, one is used as the washing oil for the first washing stage (base washing stage) and the other is used as the washing oil for the second washing stage.

In accordance with an advantageous further development of the invention, the gases, that have been produced by low temperature carbonization, are saturated or, preferably, super-saturated in a gas saturation stage—prior to entry into the spray washer—with washing oil or oil that has been produced by low temperature carbonization. The gas, that has been produced by low temperature carbonization, is cooled as a result of the pre-saturation. The washing oil for the pre-saturation process is advantageously taken from the spray washer sump. The stream of gas, that has been produced by low temperature carbonization and that is saturated or, as the case may be, super-saturated with washing oil, is preferably directed eccentrically and in an off-center manner onto the surface of the liquid in the sump and is led into the spray washer. As a result of this type of guidance of the stream, a centrifugal field is built up in the lowermost washing stage, i.e. the base washing stage, as a result of which the coarse dust particles and condensate drops are spun out and are separated at the wall of the spray washer. If the stream of gas, that has been produced by low temperature carbonization, is super-saturated with washing oil, then the excess washing oil wets the wall. Dust particles and condensate drops are bound in this oil. Since the spray washer wall is rinsed off in the inlet area, sediments on the wall are avoided.

The gases, that have been produced by low temperature carbonization, ascend within the lowermost washing stage (base washing stage). In this way, they are purified in the counter-flow mode with washing oil from pressure nozzles. By the pressure nozzles a drop spectrum is produced with a Sauter diameter (the ratio of the volume to the surface of all drops) of approximately 900 mm. The pressure nozzles are arranged in such a way that one ensures both a uniform drop density in the washing stage and adequate wetting of the wall of the spray washer. As a result of suitable drop diameters, the formation of a spray mist is avoided. The separated dust mass and condensate mass are rinsed into the sump of the spray washer. In this way, "rinsing off" of the wall by means of the excess oil from the gas pre-saturation stage is assisted by the washing oil from the pressure nozzles of the base washing stage. Separation of the solid particles is enhanced further if the solid particles serve as condensation nuclei for the condensation, or partial condendsation, of the washing gases or, as the case may be, the gases that have been produced by low temperature carbonization.

The stream of washing oil that has passed through the pressure nozzles of the base washing stage is drawn off from the following washing stage/s (the second and/or subsequent washing stage) that is preferably arranged above it using, for example, a washing oil pump. In the first washing stage, use is thus made, as the washing oil, of dust-laden washing oil and condensate from the second wash-stage. As a result of this, the first washing stage serves as a "dust sink" also for the dust that is washed out in the second stage.

The sump product from the base washing stage is composed of nozzle washing oil, excess washing oil, condensate and dust. In order to avoid blockages, the washing oil from the sump is constantly kept in circulation. Part of this sump product is fed to the gas pre-saturation stage. A small part of the sump product is pumped to the low temperature carbonization oven, as a result of which part of the dust is simultaneously removed.

The gas, that has been produced by low temperature carbonization and that leaves the base washing stage, flows into the second washing stage, preferably via an inclined flue base. This flue base simultaneously serves as a washing oil collector and receptacle for the washing oil for the washing oil pump by means of which the pressure nozzles of the base washing stage and at least the second washing stage are charged with washing oil. In the second washing stage, the gases, that have been produced by low temperature carbonization, are purified and cooled exactly as in the base washing stage.

In accordance with a further development of the invention, the gases, that have been produced by low temperature carbonization, are treated in three washing stages that are arranged one above the other. In this case, the second washing stage is the middle washing stage. The mass flow of washing oil that is used in the middle washing stage is made up from two washing oil mass flows:

One fraction consists of a recirculation mass flow that is fed back into the circuit, via the washing oil pump, from the washing oil of the middle washing stage that has been collected, for example, on the inclined flue-base of the middle washing stage.

The second fraction of the washing oil mass flow from the middle washing stage consists of a nozzle mass flow as well as condensate that have been removed from the uppermost washing stage (the head washing stage)—and this washing oil is pumped off from the inclined flue base of the head washing stage by means of a pump. Before it is combined with the recirculation mass flow from the middle washing stage, it can run through a heat exchanger.

The condensates that are generated in the middle washing stage consists predominantly of washing oil that has been evaporated into the gas, that had been produced by low temperature carbonization, in the gas pre-saturation stage.

The condensate, that is used as the washing oil, can be composed of condensate from the gas, that has been obtained by low temperature carbonization, or from extraneous oil or from a combination of both. In this connection, the supply of washing oil must be at least as large as the quantity of oil that has been removed from the washer with the washed out dust.

The gases, that have been produced by low temperature carbonization, flow from the middle washing stage into the head washing stage via the flue base and are treated with washing oil in the counterflow mode in the head washing stage. In this connection, the flue base also serves as a collector for the washing oil and as a receptacle for the washing oil for the washing oil pump in the head washing stage.

As in the two preceding washing stages, distribution of the washing oil also takes place here by means of pressure nozzles. The washing oil mass flow is generally composed of three washing oil mass flows:

The largest fraction of the nozzle mass flow consists of the recirculation mass flow from the head washing stage. This means that the washing oil, that is collected on the flue base of the head washing stage, is kept in circulation. In this connection, this washing oil mass flow is cooled, as already mentioned, by means of a heat exchanger (air cooler).

The second fraction of the nozzle mass flow consists of an added flow of oil, comprising—in particular—a mineral oil mass flow, preferably in the boiling range of heavy diesel fuel (SDK) that is at the ambient temperature.

The third fraction, i.e. the condensates that are generated within the head washing stage, consist predominantly of washing oil that has [now-] been evaporated beforehand into the oil, that had been produced by low temperature carbonization, in the gas pre-saturation stage.

The gas, that had been produced by low temperature carbonization and that has been purified and saturated with washing oil, is led via the head of the spray washer, preferably at an average temperature of 35° C. to approximately 140° C., to systems for its further utilization, for example, as a combustion medium for a combustion chamber, especially for the combustion chamber of a low temperature carbonization oven. As a result of the vapor-like washing oil fraction, that optionally remains in the gas, that had been produced by low temperature carbonization and that has had dust removed from it, the heating value of the gas is rendered uniform so that one compensates for variations in its heating value as a consequence, for example, of a differing composition of the material that is subjected to low temperature carbonization. The supply of heating oil to the combustion chamber is no longer required or at least lowered.

With the help of the spray washer in accordance with the invention, one can virtually completely remove dust from gas that has been produced by low temperature carbonization. Because of the additional separating effect via the gas pre-saturation stage and the spray washer inlet geometry, the degree of dust separation of the base washing stage amounts to approximately 80%. For the middle washing stage, one can count on a degree of dust separation of approximately 70% and, for the head washing stage, one can count on a degree of dust separation of approximately 60%. In the case of a two-stage mode of operation, a total degree of separation of approximately 94% therefore arises. The total degree of separation of the three-stage spray washer amounts to approximately 98%.

Even in the case of malfunctions, such as, for example, a power outage, removal of dust still takes place from the gas that had been produced by low temperature carbonization. In this connection, the sump product pump should, for safety reasons, be connected to an emergency power supply in order that the gas pre-saturation stage be active even in the case of a power outage.

In the case of a malfunction in all the other washing oil flows because of a power outage, a total degree of separation by sedimentation and separation by deflection to the extent of approximately 45% arises within the "gas washer".

The spray washer in accordance with the invention exhibits big advantages in regard to the throughput rate and the availability of low temperature carbonization units:

As a result of the virtually complete separation of dust by means of the spray washer, post-connected plant components such as, for example, blowers, combustion chamber kettles and the hot gas system, such as the hot gas system for the low temperature carbonization oven, are protected against dust deposits and the caking on of dust. As a result, the proneness to malfunction of these plant components, that are significant for the operation of a low temperature carbonization plant, is reduced considerably as a result of which higher total plant availability results.

The spray washer in accordance with the invention is envisaged for continuous operation.

A heated container for the washing oil for the intermediate storage of washing oil for the controlled starting up of the entire low temperature carbonization plant is also provided with advantage for the spray washer in accordance with the invention. A pump for the washing oil serves for the recirculation of the contents of the container and for pumping off into the empty spray washer when it is to be taken into operation again (new loading up). Alternatively, the contents of the container can also be fed to a low temperature carbonization oven that is in operation and can undergo low temperature carbonization.

BRIEF DESCRIPTION OF THE DRAWING

The invention will be elucidated in more detail below on the basis of the drawing and an example of an embodiment:

The single figure shows—in the form of a schematic illustration—a section through a spray washer in accordance with the invention with three washing stages.

DESCRIPTION OF THE INVENTION

Figure 1:
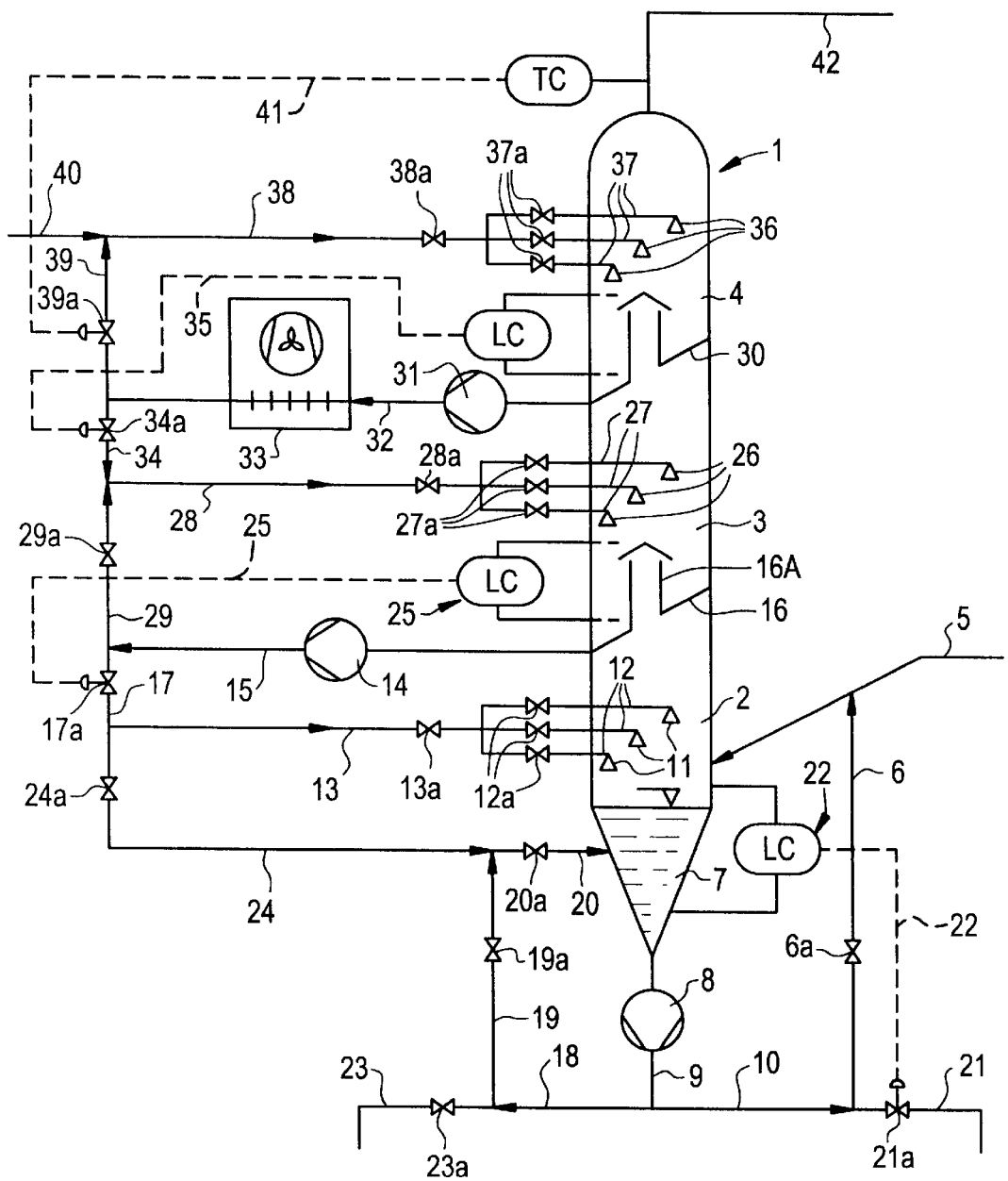

From the figure it can be seen that dust-laden gas, that had been produced by low temperature carbonization, is fed in via a feed line 5 into a spray washer 1 with a base washing stage 2, a middle washing stage 3 and a head washing stage 4. The feed line 5 is inclined and is constructed in such a way as a gas pre-saturator that washing oil is injected, by means of a nozzle, into this stream of gas, that had been produced by low temperature carbonization, in the counterflow mode in this line via a tubular line 6. In this way, the gas, that had been produced by low temperature carbonization, cools and becomes simultaneously saturated with washing oil. The washing oil mass flow in the tubular line 6 is thereby advantageously adjusted in such a way, by means of a valve 6a, that super-saturation takes place in the stream of gas that had been produced by low temperature carbonization.

The washing oil mass flow from the tubular line 6 is taken from the spray washer sump 7 and is fed to the tubular line 6, by means of a pump 8, via the tubular lines 9 and 10.

The flow of gas, that had been produced by low temperature carbonization and that has been saturated or, as the case may be, super-saturated with washing oil, is directed eccentrically and downward at an angle to the surface of the sump liquid and is thereby led into the spray washer 1. In this connection, coarser fractions of dust, in particular, are released to the sump from the gas, that had been produced by low temperature carbonization, as a result of mass inertia and spray washing. The gas, that had been obtained by low temperature carbonization, then flows upward within the base washing stage 2, whereby it becomes intensively wetted in the counter flow mode by washing oil that emerges from the pressure nozzles 11. The arrangement of nozzles is selected in such a way that one ensures both a uniform drop density in the base washing stage 2 and adequate wetting of the walls of the spray washer 1.

A sump product is generated in the spray washer sump 7 that is composed of nozzle washing oil, excess washing oil, condensate and dust. Approximately half of this oil is constantly circulated by means of the pump 8 via the tubular lines 9, 18, 19, and 20. The other half, as already described, is led to the tubular line 5 (gas pre-saturation).

A small part of the sump product is fed to the low temperature carbonization oven via line 21, whereby the low temperature carbonization oven thus serves as a dust sink, and it is generated in solid form from the main part of this dust as an ingredient of coke that is produced by low temperature carbonization.

The washing oil level in the spray washer sump 7 is monitored and regulated by means of a filling level monitoring system 22 with a valve 21a. In the case of controlled starting up of the spray washer 1, the entire washing oil from the spray washer 1 can be run off for intermediate storage via the tubular line 23 with a valve 23a.

The gas, that had been produced by low temperature carbonization, flows from the base washing stage 2 via the flue 16a of a flue base 16 into the middle washing stage 3. The flue base 16 is inclined and serves as a washing oil collector and as a washing oil receptacle for a washing oil pump 14.

Within the middle washing stage 3, the gas, that had been obtained by low temperature carbonization, flows in the counterflow mode to the washing oil that is fed in via the pressure nozzles 26. The gas, that had been produced by low temperature carbonization, is purified and cooled by the washing oil. The washing oil is collected on the flue base 16 and is removed via a tubular line 15 by the washing oil pump 14. A portion of this washing oil is pumped into the tubular nozzle lines 12 via tubular lines 17 and 13 and is sprayed in via the pressure nozzles 11. It is thus used as the washing oil from the base washing stage 2.

The second portion of the washing oil mass flow from the tubular line 15 is pumped via a tubular line 29 with a valve 29a and a tubular line 28 with a valve 28a into the tubular nozzle lines 27 with valves 27a and is sprayed in by means of the pressure nozzles 26. This portion of the washing oil mass flow from the middle washing stage 3 is thus circulated. Further washing oil is also sprayed in via the pressure nozzles 26, that has been removed from the head washing stage 4 with a washing oil pump 31 via the tubular lines 32 and 34.

The gas, that has been produced by low temperature carbonization, is cooled—but only to a slight extent—and has further dust removed from it within the middle washing stage 3. The predominant portion of the condensate mass that is generated consists of washing oil that has been evaporated beforehand—in the gas pre-saturation stage—into gas that had been produced by low temperature carbonization. The washing oil level of the middle washing stage 3 is monitored and regulated by means of a filling level monitoring system 25 with a valve 17a.

The gas, that has been produced by low temperature carbonization, flows from the middle washing stage 3 into the head washing stage 4 via a flue base 30. The flue base 30 serves as a washing oil collector and as a receptacle for washing oil for a washing oil pump 31. The gas, that has been produced by low temperature carbonization, flows in the counterflow mode to the washing oil within washing stage 4. As in the two preceding washing stages 2 and 3, distribution of the washing oil takes place by means of pressure nozzles 36 in the head washing stage 4, too. The main portion of this washing oil mass flow consists of the recirculation mass flow from the head washing stage 4. The washing oil, that is collected on the flue base 30, is pumped, via the tubular line 32, by means of the washing oil pump 31 into a tubular line 39 with valves 39*a* and a tubular line 38 with valve 38*a* into tubular nozzle lines 37 with valves 37*a* and is sprayed in through the pressure nozzles 36. A washing oil air cooler 33 is arranged in the tubular line 32. Heavy diesel fuel, that is at the ambient temperature, is added to this washing oil flow via a tubular line 40.

A portion of the cooled washing oil from the tubular line 32 is sprayed in, via the tubular lines 34 and 28 as well as via the tubular nozzle lines 27 and the pressure nozzles 26 in the medium washing stage 3.

The main fraction of the condensate from the head washing stage 4 consists of washing oil that had been evaporated beforehand, in the gas pre-saturation stage, into the gas that had been produced by low temperature carbonization.

The purified gas, that had been produced by low temperature carbonization and that has been saturated with washing oil, is fed via the tubular line 42 to the combustion chamber, that is not illustrated, of the low temperature carbonization oven and is burned there. The gases, that have been produced by low temperature carbonization, leave the spray washer 1 at a temperature of approximately 140° C. This temperature is monitored by means of a temperature monitoring system 41 and is regulated via the recirculation mass flow of the head washing stage 4 with the help of valve 39*a*. In addition, a filling level monitoring system 35 is provided in the head washing stage 4, whereby this prevents flooding of the spray washer 1.

EXAMPLE OF AN EMBODIMENT 2400 kg/h of dust-laden gas, that had been produced by low temperature carbonization, are fed from a trash pyrolysis plant via the declined feed line into the three stage spray washer (as shown in the figure) at an average gas velocity of approximately 20 m/s. This line is constructed in the form of a gas pre-saturator. Washing oil is injected, via nozzles, into the feed line in the counterflow mode relative to the stream of gas that had been produced by low temperature carbonization. In this way, the gas, that had been produced by low temperature carbonization and that is at a temperature of approximately 450° C., is cooled to 275° C. and is supersaturated with washing oil. The washing oil mass flow amounts to approximately 5000 kg/h. The excess of non-evaporated washing oil amounts to approximately 650 kg/h. The washing oil mass flow is taken from the spray washer sump by means of a pump for the sump product with an excess pressure of the nozzle receptacle of approximately 3 bar.

The gas, that had been produced by low temperature carbonization ascends within the base washing stage at an average axial gas velocity of approximately 1 m/s. In this way, it is purified in the counterflow mode with washing oil from seven pressure nozzles. The washing oil temperature at the nozzles amounts to approximately 230° C. and the excess pressure of the nozzle receptacle amounts to 4 bar. The washing oil mass flow, that passes through the pressure nozzles, amounts to approximately 3900 kg/h. The washing oil is removed from the middle washing stage by means of a washing oil pump.

Approximately 6000 kg/h of sump product are generated in the base washing stage at an average temperature of approximately 265° C. 5000 kg/h of the sump product are constantly circulated. 5000 kg/h of the sump product are fed to the gas pre-saturation stage and approximately 340 kg/h of the sump product are pumped to the low temperature carbonization oven. From the sump product that is led off to the low temperature combustion oven, the following products will arise: approximately 170 kg/h of vapor-like non-cracked washing oil, approximately 35 kg/h of low temperature carbonization coke and approximately 135 kg/h of cracked carbon products, that—apart from the low temperature carbonization coke fraction—get into the spray washer via the gas that is produced by low temperature carbonization.

The gas, that has been produced by low temperature carbonization, flows from the base washing stage into the middle washing stage via the flue. The average temperature amounts to approximately 260° C. at the entrance to the middle washing stage. Within the middle washing stage, the pyrolysis gas flows, in the counterflow mode, to the washing oil at an average axial gas velocity of approximately 1 m/s. As in the base washing stage, the injection of the washing oil takes place via 7 pressure nozzles. The washing oil mass flow, that passes through these nozzles at an excess pressure of the nozzle receptacle of approximately 4 bar and an average washing oil temperature of approximately 160° C., amounts to approximately 4000 kg/h. Approximately 2100 kg/h of the nozzle mass flow consists of the recirculation mass flow from the middle washing stage, that is fed via a washing oil pump from the washing oil that is at a temperature of 230° C. and that has been collected on the flue base of the middle washing stage (recirculation). 1900 kg/h consists of the washing oil mass flow that is removed from the head washing stage at a temperature of 80° C. behind a heat exchanger that is integrated into the recirculation mass flow from the head washing stage.

Within the middle washing stage, the gas, that had been produced by low temperature carbonization, is cooled to approximately 235° C. and approximately 2000 kg/h of condensate are generated. In total, 6000 kg/h of washing oil are collected on the flue base and are distributed by the washing oil pump (3900 kg/h to the nozzles of the base washing stage and 2100 kg/h to the nozzles of the middle washing stage).

The gas, that has been produced by low temperature carbonization, flows into the head washing stage from the middle washing stage via the flue. The average temperature of the gas that has been produced by low temperature carbonization amounts to approximately 235° C. at the entrance to the head washing stage. Within the head washing stage, the gas that has been produced by low temperature carbonization, flows to the washing oil in the counterflow mode at an average axial gas velocity of approximately 1 m/s. The washing oil mass flow, that passes through the nozzles at an excess pressure of the nozzle receptacle of approximately 4 bar and an average washing oil temperature of approximately 78° C., amounts to 7800 kg/h. Approximately 7600 kg/h consists of the recirculation mass flow from the head washing stage. This washing oil mass flow is cooled to approximately 90° C. by means of a washing oil air cooler. Approximately 200 kg/h of heavy diesel fuel are fed into this nozzle mass flow at a temperature of approximately 15° C.

Within the head washing stage, approximately 1700 kg/h of washing oil are condensed out. The gas, that had been produced by low temperature carbonization and that has been purified and saturated with washing oil, is fed—via the head of the spray washer—to the combustion chamber of the low temperature carbonization oven at an average temperature of the gas, that had been produced by low temperature carbonization, of approximately 140° C. As a result of the vaporlike washing oil fraction of 166 kg/h that remains behind in the gas that had been produced by low temperature carbonization, the heating value of the gas is made uniform so that variations in the heating value, as a consequence of varying trash composition, are compensated and an addition of heating oil to the combustion chamber is no longer required.

Approximately 98% of the dust that is contained in the gas, that had been produced by low temperature carbonization, are removed in the three-stage spray washer.

Having thus described the invention, it is claimed:

1. A device for the removal of dust from gas that has been produced by low temperature carbonization, in which the solid particles are separated by means of washing oil in a spray washer and the gases that have been produced by low temperature carbonization are cooled, said spray washer comprising at least first and second washing stages that are arranged one above the other and that are separated by an inclined flue base that serves as a washing oil collector, said inclined flue base connected to a pump via a first tubular line and each said washing stage further including a plurality of nozzles for the injection of the washing oil collected from said inclined flue base, second tubular lines connecting said first tubular line and said plurality of pressure nozzles in said first washing stage and third tubular lines connecting said first tubular line and said plurality of pressure nozzles in said second washing stage, such that recirculation of washing oil collect from the second washing stage can be recirculated to the first washing stage as well back to the second washing stage.

2. Device of claim 1, including three washing stages wherein said first washing stage is a base washing stage, said second washing stage is a middle washing stage and a third washing stage is a head washing stage, said washing stages being arranged one above the other.

3. Device of claim 2, including a declined feed line being eccentrically attached to the base washing stage.

4. Device of claim 3, including a gas saturation pre-stage provided in said declined feed line.

5. Device of claim 4, including a recirculation tubular line being connected between a spray washer sump and said declined feed line and further including means for recirculation disposed between said spray washer and said declined feed line.

6. Device of claim 1, including means for arranging said plurality of pressure nozzles for a uniform drop density in each said washing stage.

7. Device of claim 1, including means for arranging said pressure nozzles for producing a drop spectrum in each stage with a Sauter diameter of about 900 mm.

* * * * *